US005878144A

United States Patent [19]
Aucsmith et al.

[11] Patent Number: 5,878,144
[45] Date of Patent: Mar. 2, 1999

[54] DIGITAL CERTIFICATES CONTAINING MULTIMEDIA DATA EXTENSIONS

[75] Inventors: David W. Aucsmith; George Cox, both of Portland; Paul E. Onnen, Beaverton, all of Oreg.

[73] Assignee: Intel Corporation, Santa Clara, Calif.

[21] Appl. No.: 950,299

[22] Filed: Oct. 14, 1997

Related U.S. Application Data

[63] Continuation of Ser. No. 536,271, Sep. 29, 1995, Pat. No. 5,712,914.
[51] Int. Cl.$^6$ ........................................................ H04L 9/30
[52] U.S. Cl. ................................................................ 380/30
[58] Field of Search .................................................. 380/30

[56] References Cited

U.S. PATENT DOCUMENTS

| | | | |
|---|---|---|---|
| 4,993,068 | 2/1991 | Piosenka et al. | 380/30 |
| 5,005,200 | 4/1991 | Fischer | 380/30 |
| 5,142,578 | 8/1992 | Matyas et al. | 380/30 |
| 5,154,633 | 10/1992 | Nakamura | 380/30 |
| 5,164,988 | 11/1992 | Matyas et al. | 380/30 |
| 5,373,561 | 12/1994 | Haber et al. | 380/30 |
| 5,521,980 | 5/1996 | Brands | 380/30 |
| 5,541,994 | 7/1996 | Tomko et al. | 380/30 |
| 5,712,914 | 1/1998 | Aucsmith et al. | 380/30 |

OTHER PUBLICATIONS

"Draft Technical Corrigendum 2 to Recommendation X.509," ISO/IEC 9594–8(2 pages).
"Draft Technical Corrigedum 3 to Recommendation X.509, "ISO/IEC 9594–8 (1 pages).
"Information Technology—Open Systems Interconnection—The Directory: The Models: Amendment 1: Certificate Extension," (Unofficial) ISO/IEC 9594–8, pp. 1–28.
"Data Communication Networks Directory Recommendations X.500–X.521" (Melbourne, 14–25 Nov. 1988) Table of Contents pp. III–VIII.
The Directory—Authentication Framework: Data Communication Networks Directory, Recommendation X.509 (Melbourne, 14–25 Nov. 1988) pp. 48–81.
PKCS #6: Extended–Certificate Syntax Standard: An RSA Laboratories Technical Note, Version 1.5, Revised Nov. 1, 1993 (including Table of Contents) (12 pages).
"Some Examples of the PKCS Standards" An RSA Laboratories Technical Note, Burton S. Kaliski, Jr., Revised Nov. 1, 1993 (16 pgs).
"A Layman's Guide to a Subset of ASN.1, BER, and DER" An RSA Laboratories Technical Note, Burton S. Kaliski Jr., Revised Nov. 1, 1993 (36 pgs).

*Primary Examiner*—Salvatore Cangialosi
*Attorney, Agent, or Firm*—Blakely, Sokoloff, Taylor & Zafman LLP

[57] ABSTRACT

A method and apparatus of communicating information comprising providing a datum which includes a digital certificate containing data. The digital certificate including an extension which includes: a first identifier which specifies a major classification of the data; a second identifier which specifies a minor classification of the data; and data in a format according to the major classification and the minor classification, the data indicating an owner of the datum and a use for which the datum is intended. The certificate allows authentication of the certificate itself and the data contained therein, and the data contained in the certificate can include information allowing verification of the identity of the holder of the certificate.

30 Claims, 8 Drawing Sheets

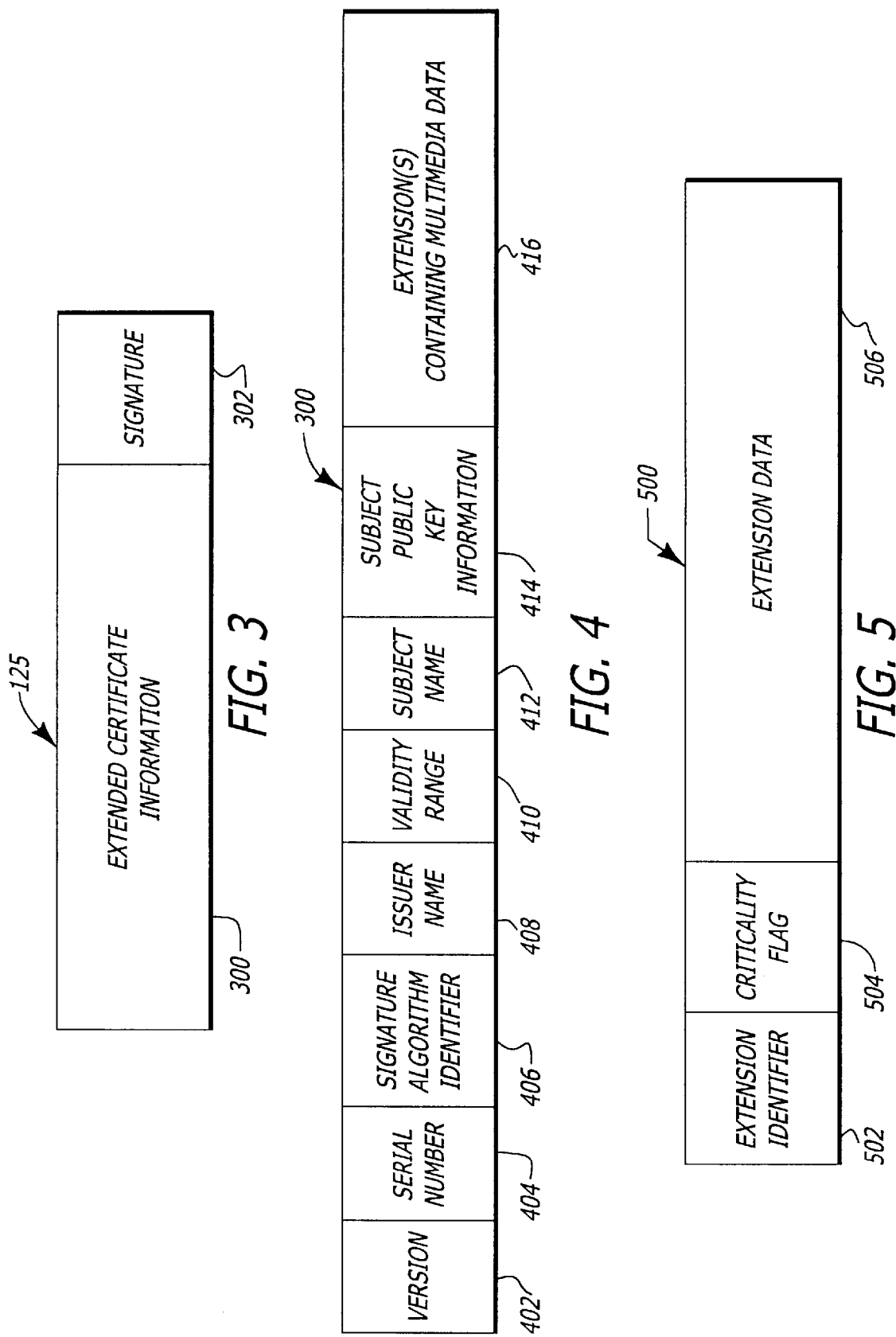

| TEMPLATE IDENTIFIER | CRITICALITY FLAG (YES) | MAJOR TYPE | MINOR TYPE | REQUIRED MAJOR MULTIMEDIA EXTENSIONS | REQUIRED MINOR MULTIMEDIA EXTENSIONS | OTHER EXTENSIONS |
|---|---|---|---|---|---|---|
| 602 | 604 | 606 | 608 | 610 | 612 | 614 |

| MAJOR TYPE = IDENTIFICATION | MINOR TYPE = CALIFORNIA DRIVER'S LICENSE | STATE LOGO | PICTURE | BIRTH DATE | HEIGHT | WEIGHT | SEX | RESTRICTIONS | LICENSE NUMBER |
|---|---|---|---|---|---|---|---|---|---|
| 702 | 704 | 706 | 708 | 710 | 712 | 714 | 716 | 718 | 720 |

| MAJOR TYPE = IDENTIFICATION | MINOR TYPE = BIRTH CERTIFICATE | HOSPITAL LOGO | PARENT'S NAMES | BIRTH DATE | HOSPITAL NAME | FOOTPRINT | BITMAP OF DOCTOR'S SIGNATURE |
|---|---|---|---|---|---|---|---|
| 802 | 804 | 806 | 808 | 810 | 812 | 814 | 816 |

| MAJOR TYPE = CREDIT CARD | MINOR TYPE = CITIBANK VISA | CREDIT CARD NUMBER | USER'S SIGNATURE | ISSUER'S NAME | ISSUER'S LOGO | USER'S PHOTO | USER'S PASSWORD | MEMBER SINCE | IMAGE OF CARD |
|---|---|---|---|---|---|---|---|---|---|
| 902 | 904 | 906 | 908 | 910 | 912 | 914 | 916 | 918 | 920 |

900

DIGITAL CERTIFICATES CONTAINING MULTIMEDIA DATA EXTENSIONS

CROSS-REFERENCES TO RELATED APPLICATIONS

This is a continuation of U.S. patent application (application Ser. No. 08/536,271) filed Sep. 29, 1995, which matured into U.S. Pat. No. 5,712,914.

BACKGROUND OF THE INVENTION

1. Field of the Invention

The present invention relates to information storage and authentication thereof. Specifically, the present invention relates to a method and apparatus for storing multi-media information in digital certificates, for example, those conforming to recommendation X.509 for authentication and security of directory services.

2. Background Information

As electronic resources proliferate, corresponding increases in the demands placed upon such resources for applications such as electronic commerce also will increase. Electronic commerce requires the authentication of users and other data prior to the performance of transactions. That is, they require that a level of trust be established prior to the performance of transactions. Currently, some methods are lacking in the establishment and maintenance of such trust.

Some prior art solutions for the establishment and maintenance of a level of trust are in existence in the prior art. One of these includes the CCITT Recommendation X.509: The Directory—Authentication Framework (1988). This standard sets forth a protocol wherein certain data are contained in a "digital certificate" which allows the authentication of a user prior to allowing access to a directory. A variety of models are set forth in this standard; however, certain minimum information, such as a distinguished name, validity date range, and accompanying digital signature, which is used to sign the certificate, are used to authenticate users prior to access to directories being granted.

The digital certificate typically assumes that certain levels of trust have already been established from higher levels in a directory hierarchy known as a certification path. A certification path need not be hierarchical, but typically is. In addition, the digital certificate described in Recommendation X.509 has been amended to specify "extensions" which may be used for stronger authentication. See, Draft Technical Corrigenda 2 and 3 to Recommendation X.509 | ISO/IEC 9594-8. These specify extensions which may be included in digital certificates without modifying the ASN.1 type certificate specified above. No provision has been made in this standard or others of which Applicant is aware in the prior art which sets forth an authentication framework for data by itself, which also includes identifying information, such as that provided in the X.509 standards, for electronic commerce and/or identification, which incorporates many of the modern data formats. These data formats include, but are not limited to, audio, video, or executable program information. Thus, what is required is an authentication framework which allows the transmission of a variety of data types, but yet, allows authentication of such data for various applications, such as modem forms of electronic commerce.

Thus, the prior art of multimedia storage and retrieval suffers from several deficiencies.

SUMMARY OF THE INVENTION

A method and apparatus of communicating information comprising providing a datum which includes a digital certificate containing data. The digital certificate including an extension which includes: a first identifier which specifies a major classification of the data; a second identifier which specifies a minor classification of the data; and data in a format according to the major classification and the minor classification, the data indicating an owner of the datum and a use for which the datum is intended. The certificate allows authentication of the certificate itself and the data contained therein, and the data contained in the certificate can include information allowing verification of the identity of the holder of the certificate.

The data includes a first portion which is in a first format according to the major classification. The data includes a second portion which is in a second format according to the minor classification. The major classification specifies a basic use of the certificate. The minor classification specifies a specific type of the certificate.

The basic use of the certificate may include identification or payment by a credit account. The data can include a logo, a signature of a holder of the certificate, a picture, sound, or video. The data can also include biometric information allowing stronger authentication that the holder of the certificate is the person to whom it was issued. The biometric information can include a fingerprint, retinal scan, hand geometry information.

BRIEF DESCRIPTION OF THE DRAWINGS

The present invention is illustrated by way of example and not limitation in the figures of the accompanying in which like references indicate like elements and in which:

FIG. 3 shows the format of an extended X.509 digital certificate.

FIG. 4 shows a more detailed view of an extended X.509 digital certificate.

FIG. 5 shows the format of extension fields in an X.509 digital certificate.

FIG. 6 shows a template extension for storing multimedia extensions in embodiments of the present invention.

FIG. 7 shows an example of an identification template extension.

FIG. 8 shows a second example of an identification template extension.

FIG. 9 shows an example of a credit card template extension.

DETAILED DESCRIPTION

Implemented embodiments of the present invention include a system which includes multimedia data in digital certificates. Although the present invention will be described with reference to certain specific embodiments thereof, including data structures, processes, etc . . . , it can be appreciated by one skilled in the art that these specific details are disclosed herein are for a complete understanding of the present invention, and do not limit its scope. It can be appreciated by one skilled in the art that many departures and other modifications of the implemented embodiments of the present invention may be performed by one skilled in the art. This invention can be practiced without these specific details.

Figure 1:
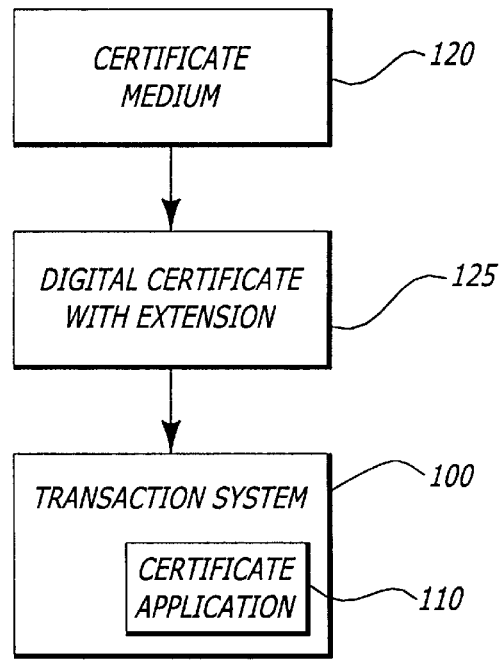
FIG. 1 illustrates the flow of a certificate containing multimedia extensions from a certificate medium to a transaction system for authentication and use.

FIG. 1 illustrates the use of a digital certificate. A medium 120 provides a digital certificate 125 with extensions to a transaction system 100. Medium 120 may be any device in which a certificate may be stored, according to the application. For example, this medium may include such as magnetic tape, disk drive on a computer system, credit card "on-a-chip", or other medium for storing information. Different media may be used according to whether a transaction is performed online, via the use of a certificate at a point-of-sale system, or for other application, such as identification, such as a driver's license or passport. Transaction system 100 receives the digital certificate, and a certificate application 110 (which is resident in memory of transaction system 100 during runtime) processes the certificate to determine authenticity and perform the transaction, according to the application's requirements. Receipt of the digital certificate may be accomplished via a certificate input device, or over a communication medium, for example, telecommunication channels. The digital certificate 125 contains a signature which guarantees the authenticity of the data contained in the certificate. Once authenticated, the application can use the data contained in the certificate according to the transaction being performed. This transaction may include verification (e.g. visual or biometric verification) of a holder of a certificate to confirm that the holder is the person to whom the certificate was issued.

Figure 2:
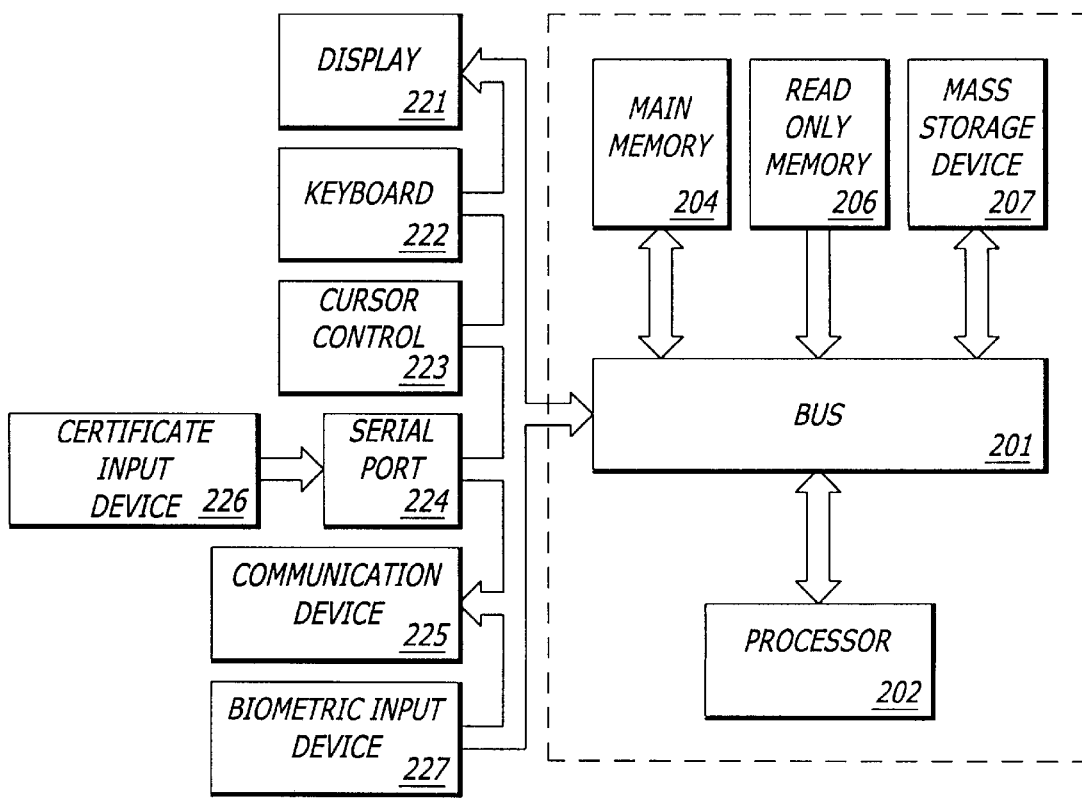
FIG. 2 shows a system in which embodiments of the present invention may be implemented.

FIG. 2 shows one embodiment of a transaction system 100. Transaction system 100 comprises a bus or other communication means 201 for communicating information, and a processing means 202 coupled with bus 201 for processing information. System 100 further comprises a random access memory (RAM) or other volatile storage device 204 (referred to as main memory), coupled to bus 201 for storing information and instructions to be executed by processor 202. Main memory 204 also may be used for storing temporary variables or other intermediate information during execution of instructions by processor 202. System 100 also comprises a read only memory (ROM) and/or other static storage device 206 coupled to bus 201 for storing static information and instructions for processor 202, and a data storage device 207 such as a magnetic disk or optical disk and its corresponding disk drive. Data storage device 207 is coupled to bus 201 for storing information and instructions.

System 100 may further be coupled to a display device 221, such as a cathode ray tube (CRT) or liquid crystal display (LCD) coupled to bus 201 for displaying information to a computer user. An alphanumeric input device 222, including alphanumeric and other keys, may also be coupled to bus 201 for communicating information and command selections to processor 202. An additional user input device is cursor control 223, such as a mouse, trackball, stylus, or cursor direction keys, coupled to bus 201 for communicating direction information and command selections to processor 202, and for controlling cursor movement on display 221.

In implemented embodiments, another device which may be coupled to bus 201 includes a serial interface 224. This may be coupled to a certificate input device 226 which can automatically input a certificate such as 125. This type of device may include a magnetic reader, disk drive, card slot or other type of automatic certificate input device.

System 100 may also include a communication device 225 which comprises a means for communicating with other devices. This communication device may also include a means for communicating with other nodes in a network or across telephone lines. In implemented embodiments, this may include a MOdulator/DEModulator (MODEM) for communication between a first system, for example, that providing a digital certificate, and system 100.

System 100 may also include a biometric input device 227 which comprises a means for inputting biometric information (e.g. a fingerprint or retina scan) from a holder of a certificate into system 100. This may allow verification that the holder of the certificate is the person to whom it was issued. Note, also, that any or all of the components of the illustrated system 100 and associated hardware may be used in various embodiments, however, it can be appreciated that any configuration of the system that includes a processor 202 may be used for various proposes according to the particular implementation.

In one embodiment of a transaction system 100, system 100 may be one of the IBM AT-compatible type personal computers such as the Gateway 2000 brand personal computer manufactured by Gateway Computer Systems. Processor 202 may be one of the Pentium® brand microprocessors available from Intel Corporation of Santa Clara, Calif. (Pentium and Intel are trademarks of Intel Corporation).

Note that the following discussion of various embodiments discussed herein will refer specifically to a series of routines which are generated in a high-level programming language (e.g., the C or C++ language) and compiled, linked, and then run as object code in system 100 during run-time. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

An extended digital certificate 125 is shown in FIG. 3. An extended digital certificate, which includes the multimedia extensions to be described here, conforms to the X.509 standard as set forth above. Extended certificate 125 includes extended certificate information 300 and a digital signature 302. Signature 302 is a digital signature which is formed by performing a hash function of the extended certificate information 300 and encrypting the result of that hash function. Any type of hash function which generates a unique value representing the data may be used, and the specific algorithm used to form the unique value can be identified in the extended information, for example, as set forth below.

A detail of extended information 300 is shown in FIG. 4. Extended information 300 conforms to Recommendation X.509, however, it contains multimedia information (images, video, sound, and/or executable programs) in field 416. The signature 302 shown in FIG. 3 is thus a signature not only of the standard authentication information contained in fields 402–414, but also of field 416 containing multimedia data. Thus, the authentication information is used for authenticating multimedia information instead of providing access to directory services, as in the prior art Recommendation X.509, and as modified by Corrigenda 2 and 3. Thus, although the multimedia extension(s), if any, contained in field 416 may provide stronger authentication of the certificate 125 for directory services than the original X.509 standard, field 416 may be used for any purposes, according to an application's requirements, for example, for use of a credit card for payment during a transaction.

The remaining fields 402–414 correspond with those set forth in Recommendation X.509. Field 402 specifies the version of the certificate, and field 404 is a unique serial number for the certificate. Field 406 specifies a signature algorithm identifier, that is, the hash function encryption algorithm used for forming the digital signature, and a size of the signature. The name field 408 includes a distinguished name that specifies the issuer of the certificate (e.g. a credit card company, company issuing an employee identification badge, or a state motor vehicle agency issuing a driver's license). In implemented embodiments of the present invention, for an identification template certificate, the name would include the name, address, social security number, etc . . . of a person being identified by the certificate. Sufficient information must be present to specifically identify the owner of the certificate.

Validity field 410 includes a date range in which the certificate is valid. This is also used for authentication purposes. If the certificate is examined outside of this date range, it is invalid (e.g. an expired driver's license, passport or credit card). The subject field 412 contains a distinguished name which defines the subject's name that differentiates him from other owners (e.g. other credit card holders). Under Recommendation X.509, the field contains the directory name of the directory for which access is desired. In implemented embodiments, it is much broader. The last field 414 is the public key information field which identifies and contains the public key of the encryption algorithm used to sign the certificate. The remainder 416 of the certificate is the data which is contained within the certificate.

Recommendation X.509 is currently lacking in facilities for identification of the owner of a certificate, as well as for its intended use. Implemented embodiments of the present invention address these shortcomings by architecting extensions to the current standard in the area of identification and template types. These specific definitions follow.

CERTIFICATE EXTENSIONS

Several new certificate extensions are set forth in implemented embodiments to allow for more widespread use of certificates. These extensions fall into two categories: Extensions used for identification purposes, and miscellaneous extensions which can be used to modify the use of the certificate in ways which have not currently been discovered. The format for all certificate extensions currently follows that found in the X.509 Corrigenda 2 and 3, and Amendment 1.

A detail of an extension field 500 which is a format used by each of the extension(s) in field 416 is shown in FIG. 5. The certificates used in implemented embodiments of the present invention include one or more extensions of the format 500 shown in FIG. 5 in field 416. The extension(s) in field 416, if any, conform to the X.509 Corrigenda 2 and 3. Each extension includes an identifier field 502 which contains a unique value identifying the type of extension contained in the extension data field 506. A criticality flag 504 indicates whether the application reading the certificate must be able read the extension, otherwise, the certificate fails the authentication check performed by the certificate application process 110. The extension data then follows the criticality flag in field 506. The extension data is DER (Distinguished Encoding Rules) encoded. The data includes a length field followed by the octets which make up the encoded data.

Pseudocode representing an extension is as follows:

```
Extensions ::= SEQUENCE OF Extension
Extensions ::= SEQUENCE
{
        extnId EXTENSION.&Id({Extension}),
        critical BOOLEAN DEFAULT FALSE,
        extn Value OCTET STRING // DER encoding of data
                value
}
EXTENSION ::= CLASS
{
        &id OBJECT IDENTIFIER UNIQUE,
        &ExtnType
}
WITH SYNTAX
{
        SYNTAX &ExtnType
        IDENTIFIED BY & Id
}
```

IDENTIFICATION EXTENSIONS

The following identification extensions are non-critical extensions.

Logo Extension

The logo extension defines a bitmap image which is used for brand identification. One example of the use of this extension would be for a credit card company such as VISA or MasterCard, to have their logo stored in this extension for display when the certificate is displayed. It has the following syntax:

```
logo EXTENSION ::=
{
        SYNTAX ImageSyntax
        IDENTIFIED BY { id-ce 30 }
}
Image Syntax ::= SEQUENCE
{
        algorithm AlgorithmIdentifier, // type of image
        imageData ImageData          // binary data for image
}
```

Signature Extension

The signature extension represents a binary-encoded facsimile of a hand-written signature. It may be a scanned copy of a written signature, or the signature may be made on a touch sensitive-pad and encoded directly. Regardless, the purpose of this extension is to display the signature in a certificate and compare it with a hand-written signature to verify identity. The syntax uses the same image data as the logo extension as follows:

```
signature EXTENSION ::=
{
        SYNTAX ImageSyntax
        IDENTIFIED BY { id-cc 31 }
}
```

Picture Extension

This extension is meant to contain a picture of the owner of the certificate. It consists of a bitmap image in some standard format. It could be used for a picture of an owner of a certificate for an identification or credit card certificate. It is constructed in the same fashion as the logo and signature extensions:

```
picture EXTENSION ::=
      SYNTAX ImageSyntax
      IDENTIFIED BY { id-ce 32 }
}
```

Sound Extension

This extension will allow a certificate to contain an audio clip. It may be used for identification of the owner's voice. It contains an audio clip (e.g. .WAV) in some standard binary format. The format for this extension is as follows:

```
audio EXTENSION ::=
{
      SYNTAX ImageSyntax
      IDENTIFIED BY { id-ce 33 }
}
AudioSyntax ::= SEQUENCE
   algorithm AlgorithmIdentifier, // type of image
   audioData AudioData     // binary data for sound clip
}
AudioData ::= OCTET STRING
```

Video Extension

This extension will allow a certificate to contain a video clip. It may be used for identification of the owners appearance or other information which needs to be stated by the owner. It contains a video clip in some standard binary format. The format for this extension is as follows:

```
video EXTENSION ::=
{
      SYNTAX VideoSyntax
      IDENTIFIED BY { id-ce 34 }
}
VideoSyntax ::= SEQUENCE
   algorithm AlgorithmIdentifier, //type of clip
   videoData VideoData    //binary data for video clip
}
VideoData ::= OCTET STRING
```

If a certificate contains both an audio and video extension, they are assumed to be synchronized in time; that is, the algorithms used to create both of them must be able to be synchronized if both the audio and video are started at the same time.

Biometric Extensions

This extension can represent some biometric input which is used for identification purposes. The goal of these formats is to verify that the user of the certificate is really who they say they are. The data stored with the certificate would be compared with that input via some biometric device to validate the user's identity. One possible use of this extension is in security access cards where the user of the card must validate themselves in order to gain entry into high-security building or room.

Biometric devices come in several forms, each of which represents data in one or more different binary formats. Following is a list of the more popular biometric formats and the type of extension(s) they require. An important consideration regarding biometric devices is that the input data from the user can change over time. That is, a person's fingerprint, hand print, or voice can change over time, eventually rendering the certificate invalid.

Fingerprint

Fingerprints are stored in one of three different formats: Image, language, and index plot. Image format is simply a bitmap image which must be visually compared to that stored in a certificate. This data will be stored in the following extension:

```
fingerprintImage EXTENSION ::=
{
      SYNTAX ImageSyntax
      INDENTIFIED BY { id-ce 35 }
}
```

The language format is an ASCII representation of the fingerprint after filtering the fingerprint image. This value can then be compared to that stored in the certificate. This data will be stored in the following extension format:

```
fingerprintLanguage EXTENSION ::=
{
      SYNTAX FingerPrintLanguageSyntax
      IDENTIFIED BY { id=ce 36 }
}
FingerPrintLanguageSyntax ::= IA5String
```

The last format for storage of fingerprints is via an index plot of the fingerprint. This plot is also a bitmap representing the print, but only is concerned about certain aspects inherent in the print. This extension is also stored as an image:

```
fingerprintIndexPlot EXTENSION ::=
{
      SYNTAX ImageSyntax
      IDENTIFIED BY { id=ce 37 }
}
```

Retina Scan

Retina scans create a bit vector representing the location of blood vessels in the retina of the eye. This relatively short vector generated by a scanning device can be compared to that stored in a certificate for identification purposes. Since the result is simply a bitmap, the following extension syntax is used:

```
retinaScan EXTENSION : :=
{
      SYNTAX ImageSyntax
      IDENTIFIED BY { id=ce 38 }
}
```

Voice Print

Voice prints are usually stored as audio files and are processed to compare two samples. Thus the audio extension format will be used:

```
voicePrint EXTENSION : :=
{
        SYNTAX AudioSyntax
        IDENTIFIED BY { id=ce 39 }
}
```

Hand Geometry

Geometry of the hand is usually stored in an image format. The following extension is defined:

```
handGeometry EXTENSION : :=
{
        SYNTAX ImageSyntax
        IDENTIFIED BY { id=ce 40 }
}
```

Dynamic Signature

Dynamic Signature data is stored as accelerations sampled during the actual writing of user's signature. This data will be sorted in some binary format for later comparison with that received from the biometric device. It is unclear what exact format this data will take.

MISCELLANEOUS EXTENSION

Account Number Extension

This extension is used to store an account number in a certificate. It may not always be possible to use the serial number to store the account number in the case of revocation and later reinstatement, where the same account number would be used. Hence the serial number cannot be use in this case as serial numbers must be globally unique. The syntax for this extension is as follows:

```
accountNumber EXTENSION ::=
{
        SYNTAX AccountNumberSyntax
        IDENTIFIED BY { id=ce 41 }
}
        AccountNumbersyntax ::= INTEGER
```

Executable Code Extension

This extension is reserved for use by applications to execute trusted code contained in the certificate. The extension is simply a sequence of bytes which will be interpreted by the application as an executable. The format is as follows:

```
executablecode EXTENSION ::=
{
        SYNTAX Executablecodesyntax
        IDENTIFIED BY { id=ce 41 }
}
ExecutableCodesyntax ::= OCTET STRING
```

TEMPLATE EXTENSIONS

A template extension is used to determine which template the certificate follows, that is, which extensions are to be found in the extensions field in a certificate. This extension is located at a well-known place in the extension list (e.g. the first extension) and gives insight into what the certificate is used for and perhaps how to display the certificate to the user. The template types are discussed in detail below. The syntax for this extension is as follows:

```
templateExtension EXTENSION ::=
{
        SYNTAX TemplateSyntax
        IDENTIFIED BY { id=ce 41 }
}
        TemplateSyntax ::= SEQUENCE
        major INTECER, // major number off template
        minor INTEGER // template minor number
```

An illustration of a template extension 600 is shown in FIG. 6. A template identifier field 602 contains a unique value identifying the extension as a template extension. The template extension is critical, that is, if the application cannot interpret the template, it cannot use the certificate for any purpose other than as a template for the purposes specified in the major and minor type fields 606 and 608. The criticality flag in field 604 is set by default to "yes", however, it may be set to "no" in some implementations. The template identifier determines which template (if any) the certificate follows.

The template extension is made up of a major and minor type specified in fields 606 and 608. The major type contained in field 606 represents the basic use of the certificate, for example, whether it is used for identification or a credit card. The minor type contained in field 608 represents the exact type of data the certificate stores. For example, a certificate could have the major type of identification and the minor type of driver's license. The major type specifies a certain set of required multimedia extensions (either implicitly or explicitly through some undefined mechanism) which must be used to verify the holder of the certificate. Verification of the holder of the certificate can be performed using any of the multimedia extensions set forth above.

The template extension is placed in a well-defined place in the certificate, in this embodiment, as the first extension in the extensions portion of the extended X.509 certificate. Implicitly, the major and minor type specify the number and types of fields which follow in the extension, and each extension includes an identifier which identifies the specific extension. Thus, required major multimedia extensions 610 follows the specification of the minor type, and required minor multimedia extensions 612 follows the required major multimedia extensions 608. Required major multimedia extensions 610 include data common to all certificates of the major type, and required minor multimedia extensions include data specific to the specified minor type. Lastly, format 600 includes an "other extensions" field 614 which are other extensions used in the certificate which are not of the required major or minor types.

Following is a list of defined major and minor template types in implemented embodiments of the present invention and a description of each.

IDENTIFICATION TEMPLATE TYPE

This major type of template includes one or more of the identification certificate extensions defined above. This class of template includes the minor types of applications as set forth in Table 1.

TABLE 1

| Minor Type | Extensions and Other Data Required |
| --- | --- |
| driver's license | state logo, picture, birth date, height, weight, sex, restrictions, license number |
| birth certificate | hospital logo, parents names, birth date, hospital name, footprint |
| social security card | SS logo, SS number |
| library card | library logo, account number |
| frequent flier card | airline logo, account number, signature of user |
| passport | country logo, picture |
| coiporate id badge | corporate logo, id number, picture, audio, video |
| building access card | logo |
| medical insurance or prescrition card | logo, account/group number |

As is apparent in the above-examples, the common element for each of the identification extensions is the logo of the issuing authority. Thus, required major multimedia extensions for such an extended certificate would include the logo in the required major multimedia extensions field.

An example of an identification template is shown as 700 in FIG. 7. This data will be contained in the extension data field 506 of a template extension. Each f the data fields will have an associated identifier and criticality flag, as set forth above. In this embodiment, the major type contained in field 702 will identify the template as type identification. The minor type, in this instance, contained in field 704, will identify the template as being of type "California driver's license." Thus, the basic use of the template is identification, and the specific instance of identification is a California driver's license.

A logo (the logo of the state—the issuing authority) follows in field 706, for the required major multimedia extensions of this identification template. Subsequent fields in the certificate, in this example, are required minor multimedia extensions. These include: a image of the licensed driver in field 708; a birth date of the driver in field 710; height, weight and sex of the driver in fields 712, 714, and 716; license restrictions contained in field 718; and a license number in field 720. Thus, when authentication of the certificate takes place, the hash function is performed not only on the unextended portion X.509 portion of the certificate, but also, on extended data 700 shown in FIG. 7. A certificate thus contains data such as 700 which not only provides stronger (perhaps visual or other manual) authentication of the holder of the certificate, but also, provides a container for data which is self-authenticating. That is, it not only allows access checking of directories and associated directory services, but also, provides stand-alone features not connected with any such prior art techniques.

A second example of an identification template is shown as 800 in FIG. 8. This extension will be contained in the extension data field 506 of a template extension. The minor type, in this example, contained in field 804, will identify the template as being of type "Birth Certificate." The hospital logo follows in field 806, for the required major multimedia extensions of this identification certificate. The A following fields in the extension field are for required minor multimedia extensions. These include: the parent's names in field 808; a birth date of the child in field 810; the hospital name in field 812; a image of the footprint of the infant in field 814; and a signature of the doctor in field 816.

Credit Card Template Type

This type of certificate template includes some identification portions as well as storage for the credit card number itself. An example of this is illustrated as 900 in FIG. 9. The major type specified in field 902 is credit card, and the minor type contained in field 904, in this example, is "Citibank Visa." Fields 906–912 comprise the required major multimedia extensions fields and specify the credit card number, an image of the user's signature, the issuer's name, and the issuer's logo. The issuer's logo preserves the brand identity associated with the credit card (e.g. Citibank Visa). Other information may also be associated with the certificate, such as credit limit, etc . . . according to implementation. Minor fields may include those as illustrated in fields 914–920, such as a user's photo, user's password (for stronger authentication), a "member since" field, and an image of the card itself. In alternative implementations, it may also contain a picture of the user and an audio or video clip.

THE CERTIFICATE APPLICATION

Figure 10:
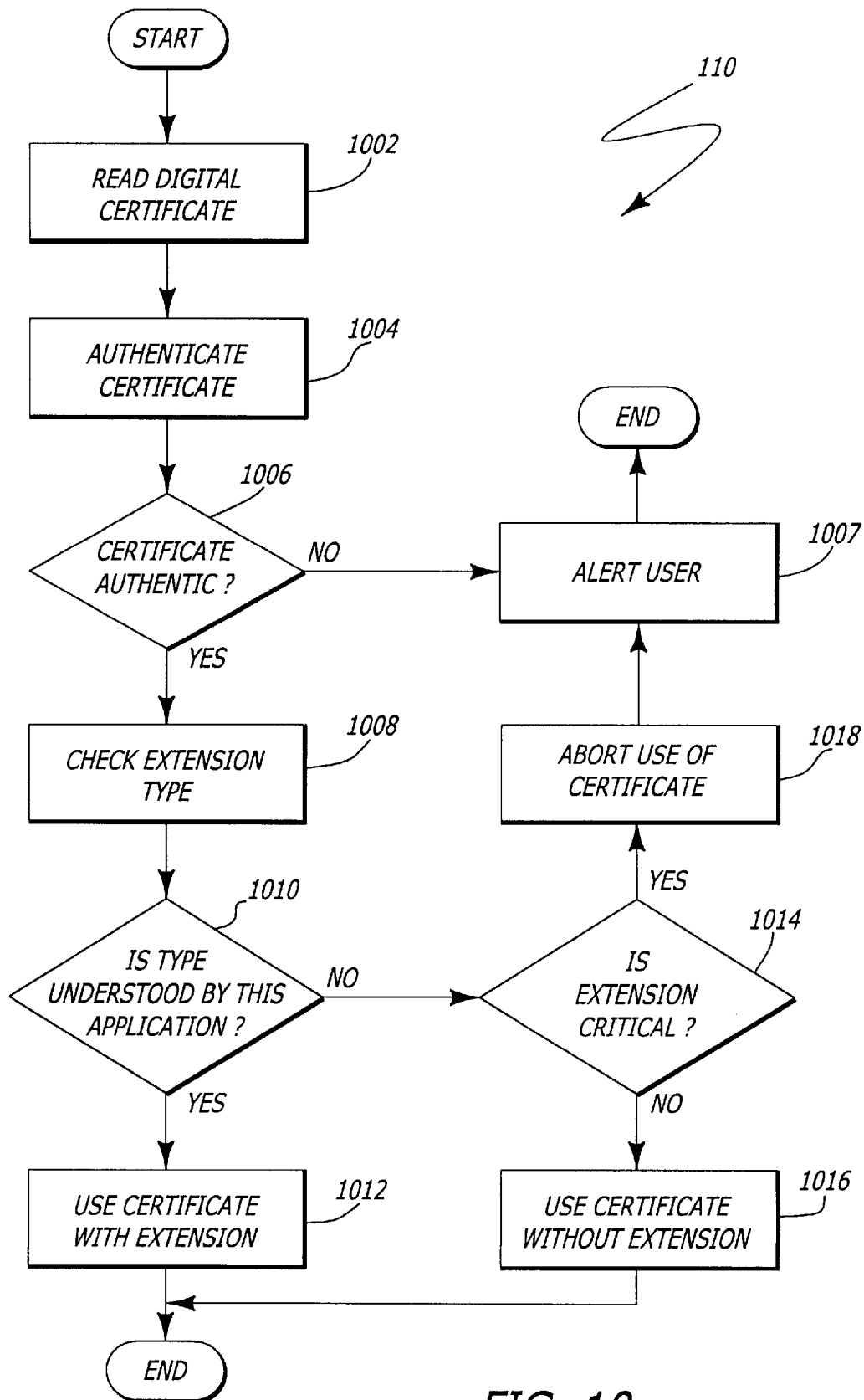
FIG. 10 shows a process which is used for authenticating and using certificates containing multimedia extensions.

A flow of a process of a certificate application 110, which is resident in computer memory during system runtime in a transaction system (e.g. a point-of-sale system), is illustrated in FIG. 10. The certificate is read at step 1002. This may be performed in any number of manners, including, but not limited to, receipt of the certificate over a communication link, reading of the certificate off magnetic media on a credit/identification card, etc . . . Authentication of the certificate is then performed at step 1004. This is performed using the specified hash algorithm of the data in the certificate, decryption technique using the public key of the issuer, and comparing the result against the supplied signature. If the certificate is not authentic, as detected at step 1006, then process 110 proceeds to step 1007, wherein a user may be alerted and the process aborts.

If the certificate is authentic, then process 110 proceeds to step 1008, wherein the extension type is checked. If the examined extension type is not understood by the application program, then the criticality flag is checked at step 1014. If the extension is critical, then the use of the certificate is aborted at step 1018, and the user can be alerted at step 1007, wherein the process ends. If the certificate extension is not critical (e.g. a template extension) then the certificate can be used, if desired by the application, without the extension(s), if any at step 1016. If the extension is understood by the application, as detected at step 1010, then it can be used at step 1012 with the extension(s). In either event, the process then is complete.

Figure 11:
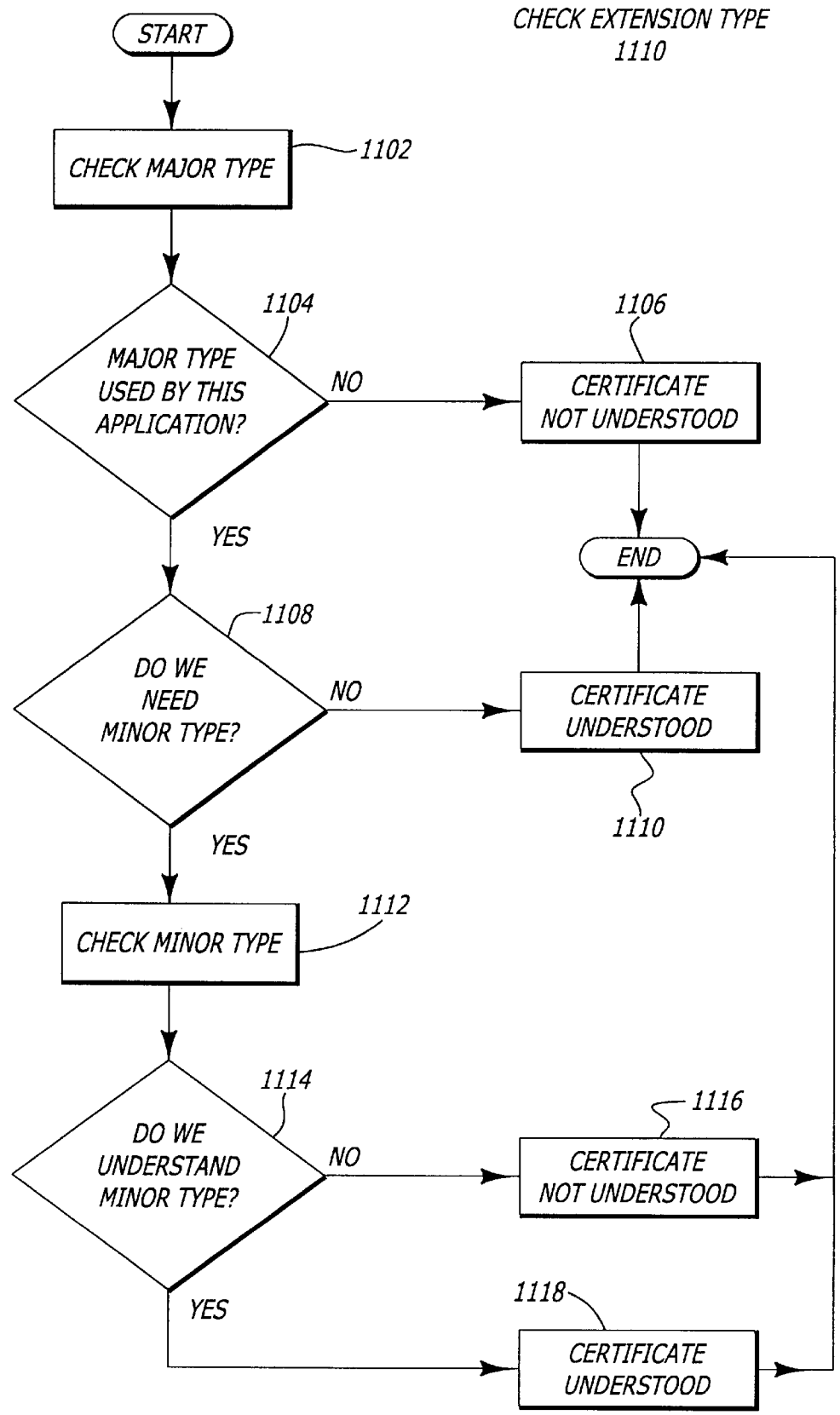
FIG. 11 shows the details of a process which checks the extension types of a digital certificate.

In the event of an extension type which is one of the simple multimedia data types illustrated and discussed above, the application simply checks the type and determines whether it is supported, and if so, can use the extension. If not, the DER length field can be examined, and the extension field(s) can be skipped over, and not used by the application, according to implementation. In the event of a template type, both the major and minor types can be examined, and if either or both are supported and required by the application, it can be used. The details of this are shown in FIG. 11.

Process 1100 shows the details of checking a template's major and minor type. First, at step 1102, the major type is checked. If it is not supported by this application, as detected at step 1104, then, at step 1106, it can be indicated that the certificate is not understood, and the process is complete. If the major type is understood by the application (e.g. an identification type), then it is determined whether the minor type is required at step 1108. For example, for a simple identification procedure with authentication, the validity of the certificate may simply be required to be checked. This would be similar to the standard X.509 authentication procedure. If not, then it the certificate is indicated as understood at step 1110, and the process is complete.

Step 1112 checks the minor type in the event that the minor type is required. If understood, as detected at step 1114, then the certificate is indicated as being understood at step 1118, and the process is complete. If not, then the certificate is indicated as not being understood at step 1116, and the process is complete.

Figure 12:
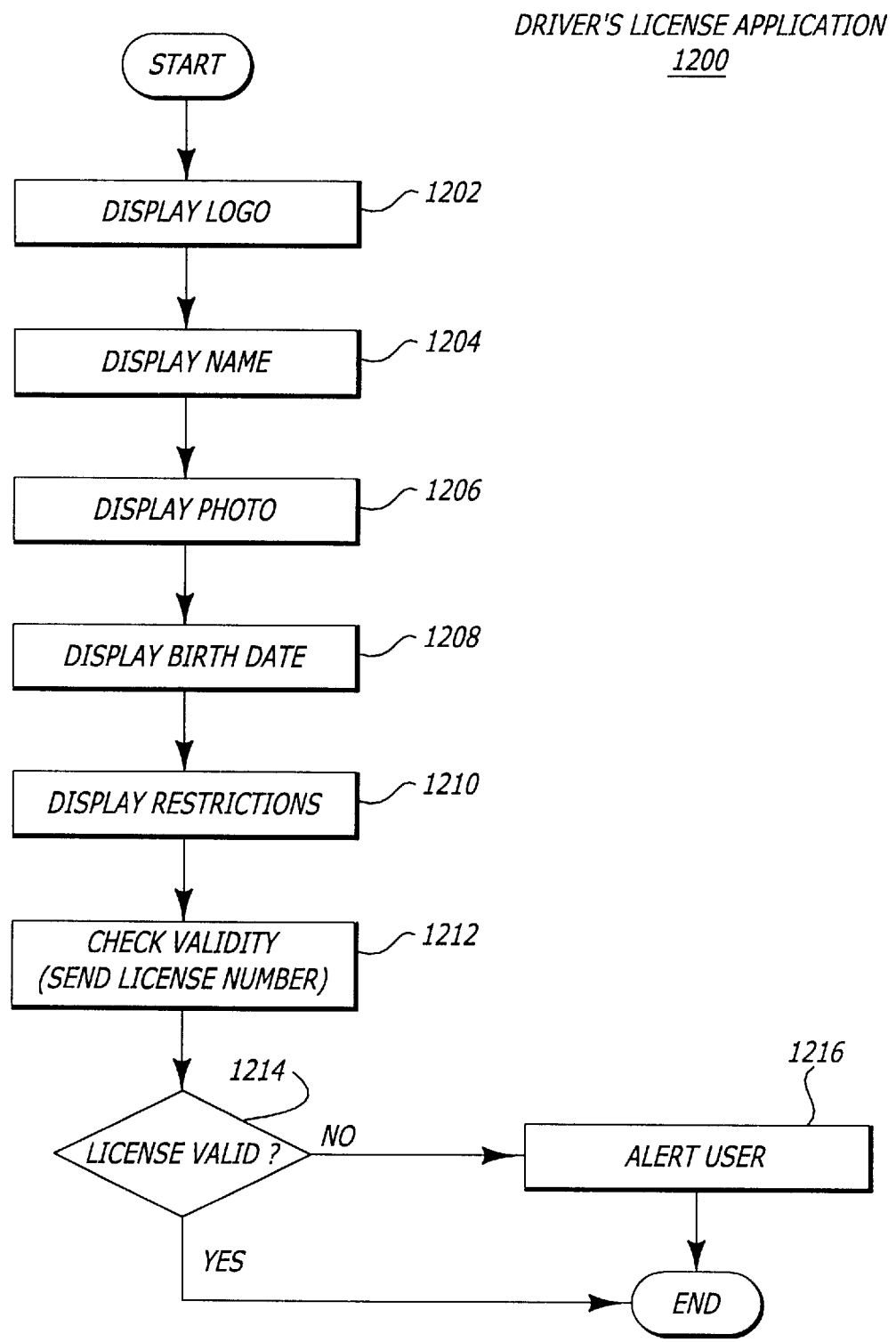
FIG. 12 shows the details of a process which uses an extended digital certificate for an identification application.
Figure 13:
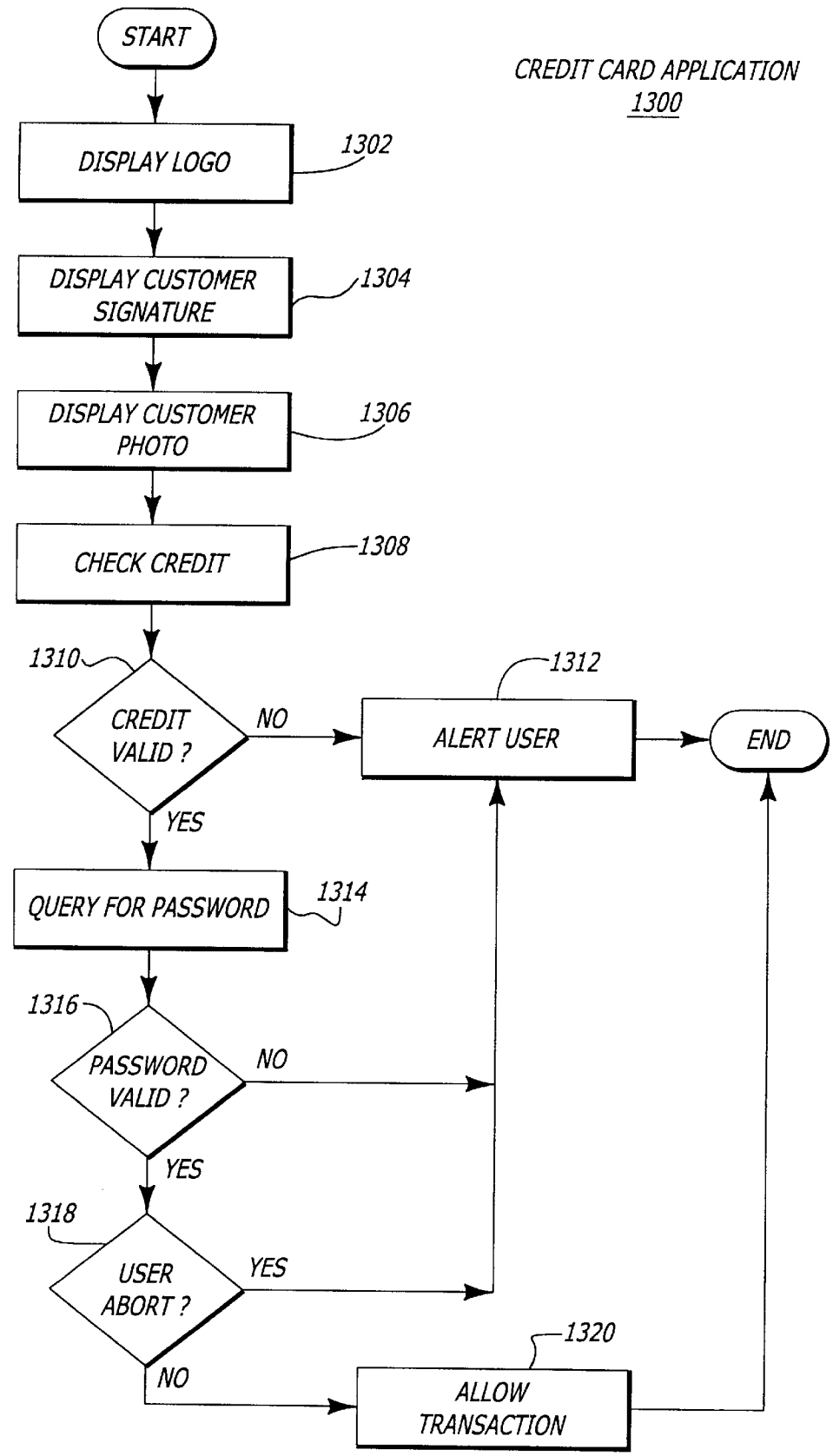
FIG. 13 shows the details of a process which uses an extended digital certificate for a credit card payment application.

FIGS. 12 and 13 illustrate examples of the use of digital certificates with multimedia extensions, as set forth at steps 1012 and 1016. These examples illustrate the processes which may be performed for the checking of the validity of a driver's license, and a credit card for the performance of a transaction, respectively. Process 1200 may be an identification process used with a driver's license, for example. Once authentication of the license via examination of the certificate has taken place, the remaining information contained in the major and minor fields may be displayed to the user. These may include the display of the state logo at step 1202, display of the driver's name at step 1204, the photo of the driver at step 1206, the birthdate at step 1208, and any restrictions of the driver at step 1210. This can allow verification of the identity of the holder of the certificate. The validity of the license may also be checked at step 1212, for example, by querying a remote system.

If the license is not valid, the user is alerted at step 1216. If it is valid, unless other actions are required to be performed (in which case process 1200 will have additional steps), process 1200 is complete.

Process 1300 shows an example of a credit card transaction application. Step 1302 displays the logo from the certificate. This ensures brand identity, for example, for on-line and point-of-sale transactions wherein no physical "card" or medium is handled by a user. Subsequent thereto, the customer signature can be displayed at step 1304, for verification purposes, and the customer photo, if any, can be displayed at step 1306. Credit of the account is then verified at step 1308, using any known technique, and if sufficient credit does not exist as detected at step 1310, the user is alerted at step 1312. The process is then complete.

In the event of the requirement of verification of the holder of the credit card certificate, a password may be queried for at step 1314, and if the password is not valid, as detected at step 1316, the user can be alerted at step 1312. If the password is valid, a user abort test is performed at step 1318 and if no abort is detected, the transaction is allowed to proceed, step 1320. In any event, the process is complete. Other steps may be performed within the credit card transaction application process 1300, and steps illustrated may be omitted, according to the specific application, the specific minor type of the credit card, etc . . .

Thus, in conclusion, a method and apparatus for formatting and using digital certificates containing extensions with multimedia data has been described. The use of certificates, as described above, as containers for data of various multimedia types is especially useful. This is particularly so for verification methods for commercial transactions, such as visual, password, and biometric verification of holders of such certificates. Although the present invention has been described with reference to certain specific embodiments thereof, the present invention should be construed as limited by the appended claims which follow.

What is claimed is:

1. A multimedia digital certificate system comprising:
    a. a first circuit to create a digital certificate for self authentication; and
    b. a second circuit to extend said digital certificate to include an extension, said extension including (i) a first field having a value that specifies a classification for said digital certificate, and (ii) a second field having multimedia data.

2. The system of claim 1 wherein said extension further including a third field to specify a specific type of said digital certificate of the classification.

3. The system of claim 1 wherein said first field of the extension includes a unique value to indicate that said multimedia data identifies a user of said digital certificate.

4. The system of claim 1 wherein said first field of said extension includes a unique value to indicate that said multimedia data identifies an issuer of the digital certificate.

5. The system of claim 1 wherein said extension further includes a fourth field containing data required for all digital certificates in the classification and a fifth field containing data required for the specific type of said digital certificate.

6. The system of claim 3 wherein said second field includes a logo.

7. The system of claim 3 wherein said second field includes data representative of sound.

8. The system of claim 3 wherein said second field includes a video clip being a plurality of successive video framing.

9. The system of claim 3 wherein said second field includes biometric information.

10. The system of claim 9 wherein said biometric information includes at least one of a fingerprint, a retinal scan and a hand geometry information.

11. A method comprising:
    creating a digital certificate which provides self-authentication; and
    extending said digital certificate to include an extension, said extension including (i) a first field to specify a basic use of said digital certificate, and (ii) a second field including multimedia data.

12. The method of claim 11 further comprising:
    providing a third field to said extension, the third field to indicate a specific type of said digital certificate.

13. The method of claim 11 further comprising:
    loading a value into said first field, said value indicating that said digital certificate is being used as an identification extension for identification of a user of said digital certificate.

14. The method of claim 12 further comprising:
    loading a value into said first field, the value indicating that said digital certificate is being used as a template extension.

15. The method of claim 11, further comprising:
    loading a value into said first field, said value indicating that said digital certificate is being used as an identification extension for identification of an issuer of said digital certificate.

16. The method of claim 12 further comprising:
    loading said second field with a logo.

17. The method of claim 12 further comprising:
    loading said second field with a digital signature.

18. The method of claim 12 further comprising:
    loading said second field with a picture.

19. The method of claim 12 further comprising:
    loading said second field with data representative of sound.

20. The method of claim 12 further comprising:
    loading said second field with a video clip being a plurality of successive video frames.

21. The method of claim 12 further comprising:

loading said second field with biometric information.

22. The method of claim 21, wherein said biometric information includes one of a fingerprint, a retinal scan and a hand geometry information.

23. A method comprising:

authenticating a digital certificate containing multimedia data; and allowing the multimedia data of the digital certificate to be perceived by a recipient of the digital certificate for identification of a user of the digital certificate.

24. The method of claim 23, wherein the multimedia data includes one of a logo, a photograph, biometric information, a signature and a video.

25. An apparatus comprising:

a card; and a memory associated with the card, the memory includes a digital certificate including an extension, the extension including (i) a first field to specify that the digital certificate is the user identification, and (ii) a second field including multimedia data used to identifying the user.

26. The apparatus of claim 25, wherein the memory is a magnetic media.

27. The apparatus of claim 25, wherein the card is an identification card.

28. The apparatus of claim 25, wherein the card is a credit card.

29. The apparatus of claim 25, wherein the card is one of a driver's license, a birth certificate, a social security card, a library card, a frequent flier card, a passport, a corporate identification badge, a building access card, a medical insurance card and a prescription card.

30. The apparatus of claim 25, wherein the multimedia data includes one of a logo, a photograph, biometric information, a signature and a video.

\* \* \* \* \*